United States Patent [19]

Shigeta

[11] 4,115,819

[45] Sep. 19, 1978

[54] SYSTEM FOR THE EDITING OF A MAGNETIC TAPE IN ONE VTR WITH A PORTION OF A SIGNAL REPRODUCED FROM A TAPE ON ANOTHER VTR

[75] Inventor: Yasuo Shigeta, Yokohama, Japan

[73] Assignee: Sony Corporation, Tokyo, Japan

[21] Appl. No.: 761,070

[22] Filed: Jan. 21, 1977

[30] Foreign Application Priority Data

Jan. 23, 1976 [JP] Japan .................................. 51-6770

[51] Int. Cl.² .............................................. H04N 5/78
[52] U.S. Cl. ...................................... 360/14; 360/74
[58] Field of Search ................... 360/14, 13, 15, 9–10, 360/74

[56] References Cited

U.S. PATENT DOCUMENTS

| 3,721,757 | 3/1973 | Ettlinger | 360/14 |
| 3,787,617 | 1/1974 | Fiori | 360/14 |
| 4,001,882 | 1/1977 | Fiori et al. | 360/14 |
| 4,040,098 | 8/1977 | Beeson et al. | 360/14 |

Primary Examiner—John H. Wolff
Attorney, Agent, or Firm—Lewis H. Eslinger; Alvin Sinderbrand

[57] ABSTRACT

In a tape editing system having a first or master VTR operable in a playback mode for reproducing video signals recorded on a first tape, and a second or slave VTR selectively operable in a playback mode for reproducing video signals previously recorded on a second tape or in a record mode for replacing a portion of such previously recorded signals with a portion of the video signals being simultaneously reproduced from the first tape; an editing control apparatus or unit is provided for precisely selecting the portion of the video signals on the first tape to be recorded on the second tape and the portion of the video signals on the second tape to be replaced by the selected video signals from the first tape.

5 Claims, 5 Drawing Figures

SYSTEM FOR THE EDITING OF A MAGNETIC TAPE IN ONE VTR WITH A PORTION OF A SIGNAL REPRODUCED FROM A TAPE ON ANOTHER VTR

BACKGROUND OF THE INVENTION

1. Field of the Invention

This invention relates generally to tape editing systems, and more particularly is directed to improvements in tape editing systems of the type having a first or master VTR for reproducing video signals recorded on a first tape and a second or slave VTR selectively operable in a playback mode for reproducing video signals previously recorded on a second tape or in a record mode for replacing a portion of such previously recorded signals with a portion of the video signals being simultaneously reproduced from the first tape.

2. Description of the Prior Art

An existing tape editing system of the above described type is provided with an editing control unit having first and second counters for counting control pulses or addresses previously recorded along the first and second tapes, respectively. In using the existing editing control unit, an operator observes an image produced on a monitor associated with the master VTR by the video signals reproduced from the first tape during a relatively slow or search forward movement of such tape, and, at the selected cut-in address or point, that is, the commencement of the portion of such video signals which are to replace a portion of the video signals on the second tape, the operator halts the forward movement of the tape and re-sets the first counter to zero. Then the first or master VTR is operated in its rewind mode, that is, the first tape is moved in its reverse direction, and the first counter counts down from zero for measuring a predetermined distance along the first tape from the selected cut-in address to a stand-by address at which the reverse movement of the first tape is halted by a signal from the first counter. The cut-in address on the second tape is similarly selected by the operator who, at such address, re-sets the second counter to zero and then causes the second or slave VTR to effect reverse movement of the second tape until the second counter halts such reverse movement at a stand-by address which is the same predetermined distance in the reverse direction along the second tape from the respective cut-in address. Thereafter, operation of both VTRs in the playback mode is initiated simultaneously starting with both tapes at the stand-by addresses thereof and with both VTRs under the control of the same external synchronizing signals so that the first and second counters count up to zero at the same time to provide a cut-in signal by which the second or slave VTR is changed-over to its record mode for recording on the second tape the video signals being reproduced from the first tape. During such recording of video signals on the second tape, at which time both tapes are being moved forwardly at the normal speed for recording and reproducing operations, the operator observes the monitor associated with the master VTR and, at a selected cut-out address or point, that is, the end of the portion of the video signals being reproduced from the first tape which are to replace a portion of the video signals previously recorded on the second tape, the operator manually changes-over the second or slave VTR from its record mode back to its playback mode.

The above described existing tape editing system permits the relatively accurate selection of the cut-in addresses on the first and second tapes, respectively, as such cut-in addresses can be selected during the relatively slow or search forward movement of the respective tapes. However, the cut-out point or address has to be selected during the normal forward movement of the tapes at the standard speed for recording and reproducing operations which is substantially greater than the search speed. Therefore, the cut-out point, which is also important in effecting the precise editing of the second or slave tape, cannot be accurately selected and, as a result, the edited tape may have undesired video signals recorded thereon. Moreover, in selecting the cut-in point or address on each of the tapes, the operator has to first halt the forward movement of the tape at the selected address and then reset the selected counter to zero, that is, a two-step operation is required in selecting each cut-in address, and the inertia of the tape drive may make it difficult to halt the tape movement with the tape precisely at the desired cut-in address. Furthermore, no provision is made in the existing tape editing system for correcting the selected cut-in address other than by the relatively tedious repetition of the above described procedure for establishing the cut-in address.

OBJECTS AND SUMMARY OF THE INVENTION

Accordingly, it is an object of this invention to provide a tape editing system which is free of the above mentioned disadvantages of the existing system.

More specifically, it is an object of this invention to provide a tape editing system in which cut-in addresses can be precisely and simply established or selected on both tapes during relatively slow or searching movement of the tapes.

Another object is to provide a tape editing system, as aforesaid, in which small corrections can be conveniently effected in the cut-in addresses following the selection of the latter.

Still another object is to provide a tape editing system, as aforesaid, in which a cut-out point or address can also be precisely selected on one or the other of the tapes during the relatively slow or searching movement thereof.

In accordance with an aspect of this invention, a tape editing system of the described type is provided with an editing control unit or apparatus which comprises, preferably for each of the VTRs, an up- and down- counter of control signals or addresses prerecorded along the respective tape, a cut-in address memory for storing the content of the tape address counter at the commencement of a portion of the video signals on the tape selected by observing the monitor associated with the respective VTR while the latter, in its playback mode, effects the relatively slow or searching forward movement of the tape, a cut-in comparator providing an output signal upon coincidence of the content of the tape address counter with the stored content in the cut-in address memory, and a reverse counter actuated by the output from the comparator during reverse movement of the tape to measure a predetermined distance from the cut-in address back to a stand-by address at which the reverse movement of the tape is halted.

In accordance with another aspect of this invention, the editing control apparatus further comprises a cut-out address memory for storing the content of a selected one of the tape address counters corresponding to a cut-out address on the respective tape at the end of the portion of the video signals thereon selected by observing the monitor associated with the respective VTR while the latter, in its playback mode, effects the relatively slow or searching forward movement of such tape, and a cut-out comparator which provides an output signal upon coincidence of the content of a selected one of the tape address counters with the stored content in the cut-out address memory.

Furthermore, it is a feature of this invention to provide a cut-in correction means associated with each cut-in address memory and including exchange switching means operable for replacing the content previously stored in the cut-in address memory with the content of the respective tape address counter, a source of correction pulses, and means for causing the tape address counter to selectively count the correction pulses in the upward or downward directions and thereby change the content of the tape address counter which, through the exchange switching means, replaces the content previously stored in the cut-in address memory.

After the cut-in and cut-out addresses have been accurately selected and stored in the respective memories, as above, the playback modes of both VTRs are selected and, during the normal forward movement of both tapes starting simultaneously from their stand-by addresses, the editing control apparatus according to this invention provides a cut-in signal for changing-over the second or slave VTR from its playback mode to its record mode in response to the output signal from at least one of the cut-in comparators, and a cut-out signal by which the second or slave VTR is thereafter automatically changed-over from its record mode back to its playback mode in response to the output signal from the cut-out comparator.

The above, and other objects, features and advantages of the invention, will be apparent in the following detailed description of an illustrative embodiment which is to be read in connection with the accompanying drawings.

DESCRIPTION OF A PREFERRED EMBODIMENT

Figure 1:
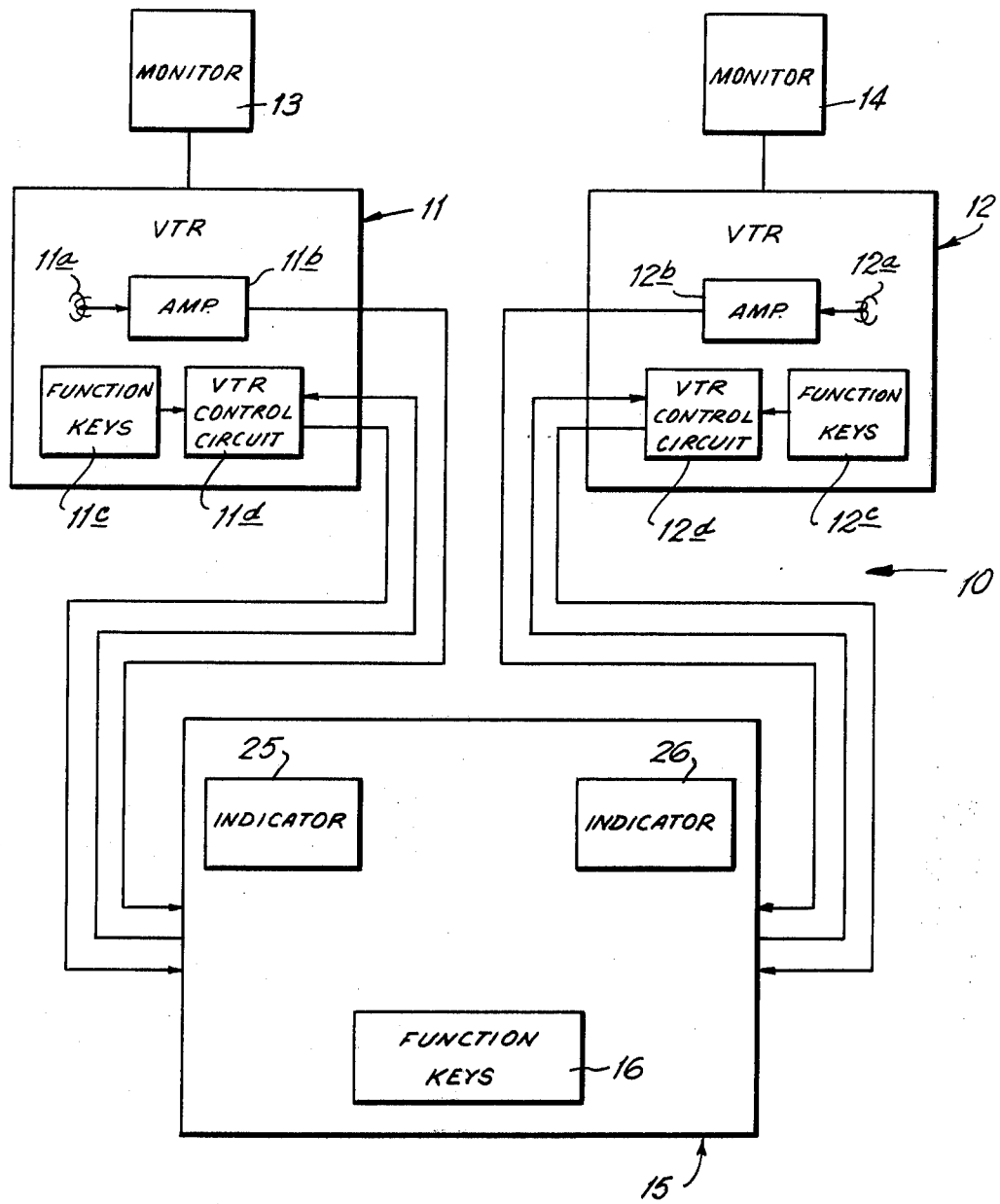
FIG. 1 is a schematic block diagram of a tape editing system according to an embodiment of this invention.

Referring to the drawings in detail, and initially to FIG. 1 thereof, it will be seen that a tape editing system 10 of the type to which this invention is applied generally comprises a conventional first or master video tape recording and reproducing apparatus or VTR 11 capable of effecting forward and reverse movement of a first magnetic tape therein and being operable, in its reproducing or playback mode, for magnetically reproducing video signals recorded on the first tape, and a conventional second or slave video tape recording and reproducing apparatus or VTR 12 capable of effecting forward and reverse movement of a second magnetic tape therein and being selectively operable in a playback mode for magnetically reproducing video signals recorded on the second tape and in a record mode for magnetically recording on the second tape the video signals being simultaneously reproduced from the first tape by VTR 11. Monitors 13 and 14 are associated with VTRs 11 and 12, respectively for displaying images corresponding to the video signals being reproduced from the first and second tapes by the VTRs 11 and 12, respectively, in the playback modes of the latter. As is well known in tape editing systems, each of the VTRs 11 and 12 is capable of effecting the forward movement of the respective tape at the normal or standard speed for its recording and reproducing operations and at a reduced or relatively slow speed for a search operation.

Further, as is well known, each of the VTRs 11 and 12 may be of the type in which the respective tape is guided in a helical path about a portion of the periphery of a guide drum having rotary heads (not shown) therewith for magnetically recording and/or reproducing the video signals in parallel skewed record tracks extending obliquely across the tape, with each such record track containing, for example, the video signals corresponding to a respective field of the television picture so that each frame of the television picture is represented by the video signals recorded in two successive record tracks. Moreover, control signals or pulses are recorded at spaced apart locations along one of the longitudinal edges of the magnetic tape, for example, a control signal or pulse is provided for each frame of the recorded video signals, so as constitute addresses of the respective frames of the video signals. As shown, the VTRs 11 and 12 have fixed magnetic heads 11a and 12a located to reproduce the control signals or pulses on the respective tapes during the forward and reverse movements of the tapes, and amplifiers 11b and 12b for amplifying the control signals or pulses reproduced from the respective tapes by heads 11a and 12a, respectively. The VTRs 11 and 12 are also shown schematically to have function or mode selecting keys 11c and 12c which are manually actuable and associated with respective VTR control circuits 11d and 12d for selectively establishing the various operating modes of the VTRs when the latter are being operated independently of each other for merely recording or reproducing video signals on the respective tapes.

However, when the tape editing system 10 is to be employed for editing, that is, for replacing a portion of the video signals on the tape in the second or slave VTR 12 with a portion of the video signals on the tape in the first or master VTR 11, the control of VTRs 11 and 12 is taken over by an editing control unit or apparatus 15 having function or mode selecting keys indicated schematically at 16 and which are manuallly actuable for selectively establishing the various operating modes of VTRs 11 and 12 in the sequence required for an editing operation, as hereinafter described in detail.

Figure 2:
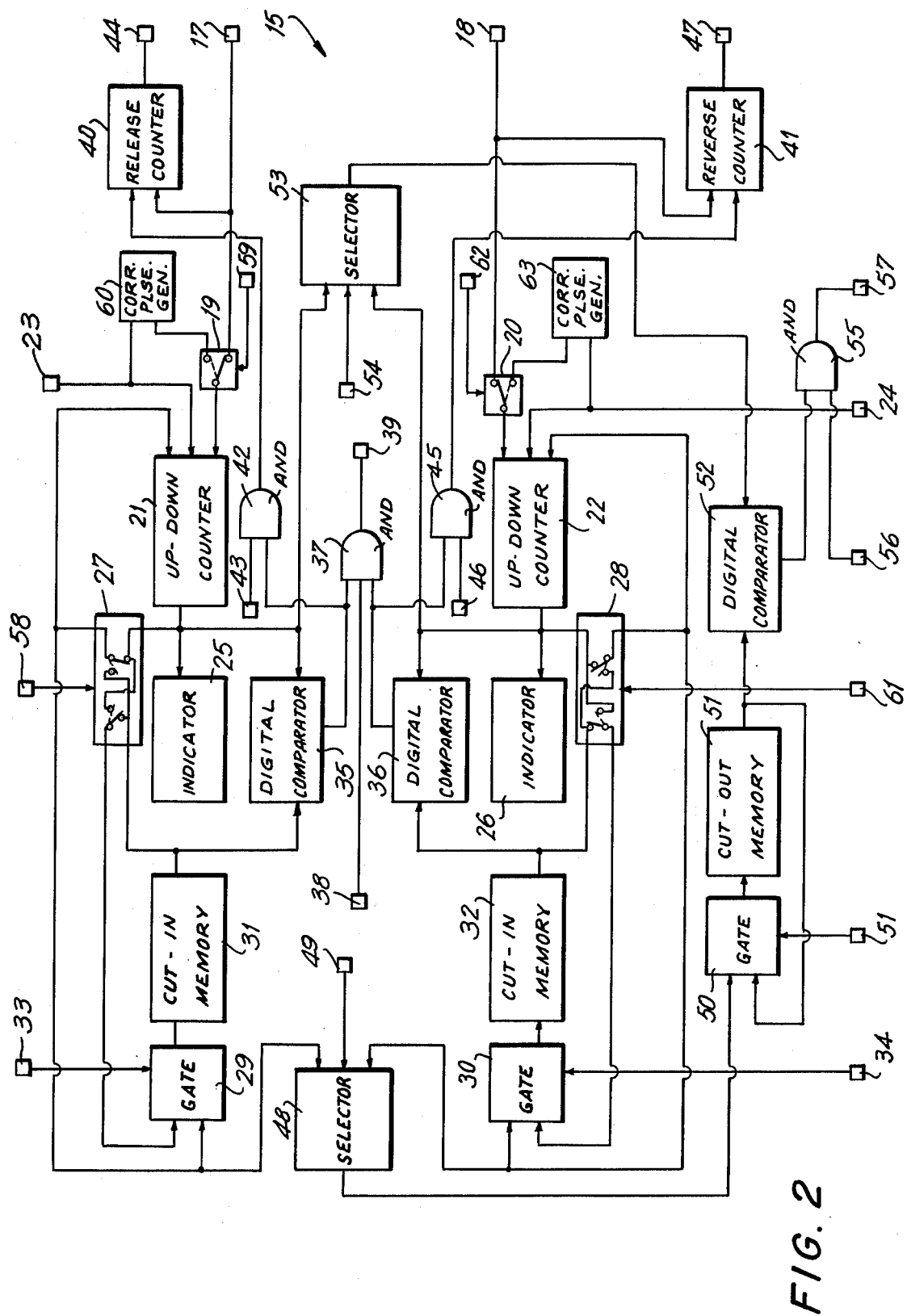
FIG. 2 is a schematic block diagram of an editing control apparatus included in the system of FIG. 1.

As shown more particularly on FIG. 2, the editing control apparatus 15 according to this invention generally comprises input terminals 17 and 18 receiving, through amplifiers 11b and 12b, the control signals or pulses being reproduced from the respective tapes by heads 11a and 11b of VTRs 11 and 12, and which are passed through switches 19 and 20, when the latter are normally positioned, as shown in full lines, to reversible or up- and down- counters 21 and 22, respectively. The counters 21 and 22 may be constituted mainly by recycling shift registers and are connected to respective terminals 23 and 24 which receive suitable signals for determining the direction in which the respective counter will count the control pulses being applied thereto. Thus, for example, when a selected one of the keys 16 is actuated for selecting a mode of VTR 11 in which the tape therein is moved in the forward direction, the resulting signal applied to terminal 23 causes counter 21 to act as an adder, that is, its content increases with each control pulse from terminal 17. On the other hand, when a selected one of the keys 16 is actuated for selecting a mode of VTR 11 in which the tape therein is moved in the reverse direction, the resulting signal applied to terminal 23 causes counter 21 to reduce its content with each control pulse from terminal 17. Therefore, it will be appreciated that the content of counter 21, at any time, corresponds to the address on the first tape in VTR 11 at which the latter is operable for reproducing or recording video signals on such tape. The counter 22 is similarly controlled by suitable signals applied to terminal 24 for either increasing or decreasing the content of counter 22 with each control pulse from terminal 18 during forward or reverse movement, respectively, of the tape in VTR 12, so that the content of counter 22 corresponds, at any time, to the address on the second tape in VTR 12 at which the latter is operable for reproducing or recording video signals on such tape.

The contents of tape address counters 21 and 22 are applied to indicators 25 and 26, respectively, for visually displaying such contents and thereby indicating the addresses of the tapes in VTRs 11 and 12, respectively. The contents of tape address counters 21 and 22 are further applied through exchange switches 27 and 28, when the latter are normally positoned as shown in full lines, to gate circuits 29 and 30, respectively, which are normally closed and have their outputs connected to respective cut-in memories 31 and 32 suitably constituted by recycling shift registers. When a cut-in address on the tape in VTR 11 has been selected, as hereinafter described in detail, a gating pulse is applied to a terminal 33 connected with gate circuit 29 in response to actuation of a selected one of the keys 16, so that gate circuit 29 is opened and the then existing content of counter 21 is stored in cut-in memory 31. Similarly, when a cut-in address has been selected on the tape in VTR 12, a gating pulse is applied to a terminal 34 connected with gate circuit 30 in response to actuation of a selected one of keys 16, so that gate circuit 30 is opened and the then existing content of counter 22 is stored in cut-in memory 32.

The editing control apparatus 15 according to this invention is further shown to comprise digital comparators 35 and 36 connected with counter 21 and memory 31, and with counter 22 and memory 32, respectively. The comparator 35 provides an output signal to an AND circuit 37 when the content of tape address counter 21 coincides with the stored content in cut-in address memory 31, and, similarly, comparator 36 provides an output signal to AND circuit 37 when the content of tape address counter 22 coincides with the stored content in cut-in address memory 32. The AND circuit 37 further has an input connected to a terminal 38 which receives a positive bias or signal in response to actuation of a selected one of the keys 16 for establishing an editing operation of system 10. Thus, an output is derived from AND circuit 37 and applied to a respective terminal 39 for suitably changing-over VTR 12 from its playback or reproducing mode to its record mode in the course of an editing operation upon the simultaneous occurrence of output signals from comparators 35 and 36 while a positive bias or signal is applied to terminal 38.

The control pulses or signals received by terminals 17 and 18 from heads 11a and 12a of VTRs 11 and 12 are also applied to reverse counters 40 and 41, respectively, which are made operative by the output signals from digital comparators 35 and 36, respectively, during reverse movement of the first and second tapes by the VTRs 11 and 12, respectively, for measuring predetermined distances along the first and second tapes in the reverse direction from the respective cut-in addresses to respective stand-by addresses. More particularly, as shown, the output of comparator 35 is connected to an input of an AND circuit 42 which has another input connected to a terminal 43 that receives a positive bias or signal in response to actuation of a selected one of the keys 16 for effecting the reverse movement of the tape in VTR 11, and the output of AND circuit 42 is connected to a control input of reverse counter 40 for initiating the counting of the control pulses applied to terminal 17 upon the occurrence of the output signal from comparator 35 during the reverse movement of the respective tape. The reverse counter 40 is operative, upon actuation by the output signal from AND circuit 42, to count a predetermined number of the control pulses applied to terminal 17, for example, a number of control pulses occurring over a period of 5 seconds, and then to provide an output signal to a respectively terminal 44 by which the reverse movement of the tape in VTR 11 is suitably halted. Similarly, reverse counter 41 is made operative to count the control pulses applied to terminal 18 by an output signal from an AND circuit 45 which, at one input, is connected to the output of digital comparator 36 and, at another input, is connected to a terminal 46 which receives a positive or bias signal when a selected one of the keys 16 is actuated for causing reverse movement of the tape in VTR 12. Thus, upon actuation of reverse counter 41 by an output signal from AND circuit 45, counter 41 is operative to count a predetermined number of control pulses applied to terminal 18, for example, a number of control pulses equivalent to a period of 5 seconds, whereupon counter 41 provides an output signal to a respective terminal 47 for suitably halting the reverse movement of the tape in VTR 12.

The editing control apparatus 15 according to this invention is further shown to include a first selector 48 having two inputs respectively connected to tape address counters 21 and 22 through exchange switches 27 and 28 when the latter are in their normal positions shown in full lines, and selector 48 is made operative in response to a first or second voltage applied to its control terminal 49 by actuation of respective selected ones of the keys 16 for applying either the content of tape address counter 21 or the content of tape address counter 22 from the output of selector 48 to a gate circuit 50. The normally closed gate circuit 50 is adapted to be opened by a gating signal applied to a respective terminal 51 in response to actuation of a selected one of the keys 16 for storing the selected content of counter 21 or counter 22 in a cut-out address memory 51 which may be constituted by a recycling shift register. The stored content in cut-out address memory 51 is applied to a digital comparator 52 which further receives the content of the tape address counter 21 or 22 for providing an output signal upon the coincidence of the received content of counter 21 or 22 with the stored content in memory 51. More particularly, as shown, the contents of tape address counters 21 and 22 are applied to two inputs, respectively, of a second selector 52 which is suitably controlled in response to first or second voltages applied to a control terminal 54 by actuation of respective ones of the keys 16 for applying either the content of counter 21 or of counter 22 through the output of selector 53 to comparator 52. The output of digital comparator 52 is connected to an input of an AND circuit 55 having another input connected to a terminal 56 which receives a positive bias or signal in response to the actuation of the selected one of the keys 16 for establishing the editing operation. Thus, upon the application of the positive bias or signal to terminal 56, the output signal derived from comparator 52 in response to the coincidence of the stored content of cut-out memory 51 with the selected content of tape address counter 21 or 22 is passed through AND circuit 55 to a terminal 57 for suitably causing change-over of the second or slave VTR 12 from its record mode back to its playback mode.

After contents of tape address counters 21 and 22 corresponding to cut-in addresses on the tapes in VTRs 11 and 12 have been selected and stored in memories 31 and 32, respectively, the editing control apparatus 15 according to the invention permits small changes to be effected in the stored contents or cut-in addresses, for example, of the order of two or three frames, independently of the movements of the tapes in VTRs 11 and 12. More particularly, with the first or master tape at rest in VTR 11, a selected one of the keys 16 may be actuated for applying a positive or bias signal to a terminal 58 for changing-over exchange switch 27 from the position shown in full lines to the position shown in broken lines so that the content previously stored in the cut-in address memory 31 is replaced by the content of the tape address counter 21. At the same time, a positive or bias signal is applied to a terminal 59 for changing-over switch 19 from the position shown in full ines to the position shown in broken lines so that a correction pulse generator 60 is connected to the input of counter 21. Thus, upon each changed-over of switch 19, a correction pulse is supplied from generator 62 to counter 21 and, simultaneously, a suitable signal is applied to the terminal 23 for determining whether each such correction pulse is counted in the upward or downward direction by counter 21. For example, if it is desired to change the cut-in address stored in memory 31 by three frames in the forward direction, switch 19 is actuated three times to the position shown in broken lines while the signal applied to terminal 23 is selected to cause upward counting of the resulting three correction pulses by counter 21. After such correction of the cut-in address or content stored in memory 31, the positive bias or signal is removed from terminal 58 to permit return of the exchange switch 27 to its normal position shown in full lines. Similarly, the stored content in memory 32, that is, the cut-in address selected on the tape in VTR 12 can be changed while the second or slave tape in such VTR is at rest by actuating a selected one of the keys 16 to provide a positive bias or signal at terminal 61 connected with exchange switch 28 for changing-over the latter to the position shown in broken lines, while a positive bias or signal is applied to a terminal 62 for changing-over switch 20 to the position shown in broken lines and thereby connecting a correction pulse generator 63 with the input of tape address counter 22. As before, for each actuation of switch 20 to the position shown in broken lines, a correction pulse from generator 63 is counted by counter 22 in either the upward or downward direction in dependence on the signal applied to the respective terminal 24, with the resulting changed count or content of counter 22 being exchanged for the previously stored content in memory 32.

The above described tape editing system 10 with the editing control apparatus 15 according to this invention operates as follows:

With video signals already recorded on the tapes in VTRs 11 and 12, all functions of the VTRs for selecting a portion of the video signals on the first or master tape in VTR 11 to be used for editing the second or slave tape in VTR 12, that is, recorded on the second or slave tape in place of a selected portion of the video signals originally recorded on the latter, and thereafter for effecting the actual editing operation are controlled by editing control apparatus 15 in response to suitable actuation of the keys 16 of the latter.

Figure 3A:
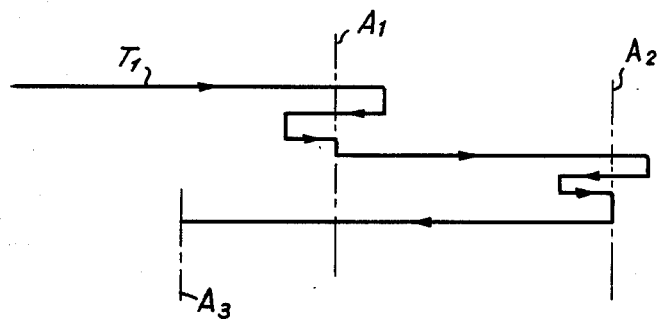
FIGS. 3A, 3B and 3C are diagrams to which reference will be made in explaining the operation of the editing control apparatus of FIG. 2.

Initially, selected ones of keys 16 are actuated to establish the searching playback mode of VTR 11 in which the video signals recorded on the first or master tape are reproduced as the first or master tape is moved in the forward or reverse direction at a relatively slow searching speed. While observing the resulting images displayed on monitor 13, the operator first causes the slow forward movement of the first or master tape $T_1$ until the observed images indicate that the tape has moved beyond the commencement of the portion of the video signals on first or master tape $T_1$ to be inserted in the second or slave tape, whereupon, tape $T_1$ is moved in the reverse direction for a relatively short distance and then again moved in the forward direction at the slow searching speed, as indicated on FIG. 3A. During all such forward and reverse movements of tape $T_1$, switch 19 is in its normal position shown in full lines on FIG. 2, so that the control pulses or signals reproduced by head 11a from tape $T_1$ are supplied to tape address counter 21. Further, the signals applied to terminal 23 are automatically changed in accordance with the direction of movement of tape $T_1$ for causing counter 21 to count the received control pulses or signals in the upward direction during forward tape movement and in the downward direction during reverse tape movement so that, at all times, the content of tape address counter 21 corresponds to the address on tape $T_1$ from which video signals are being reproduced. When the image displayed on monitor 13 during the renewed slow forward movement of tape $T_1$ exactly corresponds to the commencement of that portion of the video signals on tape $T_1$ to be selected for the editing operation, a selected one of keys 16 is actuated for applying a gating pulse to terminal 33 and thereby permitting the cut-in address $A_1$ (FIG. 3A), that is, the then existing content of tape address counter 21, to be passed through exchange switch 27 in its normal position and gate circuit 29 for storage in cut-in address memory 31.

If the cut-out address for the editing operation is to be determined on the basis of the video signals recorded on first or master tape $T_1$, a selected one of the keys 16 is actuated so that the signal applied to terminal 49 will cause selector 48 to apply the content of tape address counter 21 to gate circuit 50. With editing control apparatus 15 thus arranged, the relatively slow or searching forward movement of tape $T_1$ is continued beyond the cut-in address $A_1$ and the operator continues to observe the images displayed on monitor 13 until the observed image indicates that the tape has moved beyond the end of the portion of the video signals on tape $T_1$ to be selected for the editing operation, whereupon, tape $T_1$ is moved in the reverse direction for a short distance and then again moved in the forward direction at the slow searching speed. During such renewed forward movement, when the image observed on monitor 13 exactly corresponds to the end of the selected portion of video signals on tape $T_1$, a selected one of keys 16 is actuated to apply a gating pulse or signal to terminal 51 for opening gate circuit 50 and permitting the corresponding cut-out address $A_2$ (FIG. 3A) to be stored in cut-out address memory 51.

After the selected cut-in and cut-out addresses $A_1$ and $A_2$ have been stored in memories 31 and 51, as described above, selected ones of the keys 16 are actuated to effect the rewind operation of VTR 11 and to apply a positive bias or signal to terminal 43. Thus, during the reverse or rewind movement of tape $T_1$, the output signal from comparator 35 occurring upon coincidence of the content of tape address counter 21 with the stored content or cut-in address in memory 31 is applied to reverse counter 40 for initiating the operation of the latter. Accordingly, reverse counter 40 applies a signal to terminal 44 for halting the reverse or rewind movement of tape $T_1$ at the stand-by address $A_3$ (FIG. 3A) which is a predetermined distance in the reverse direction along tape $T_1$ from the previously selected cut-in address $A_1$.

Figure 3B:
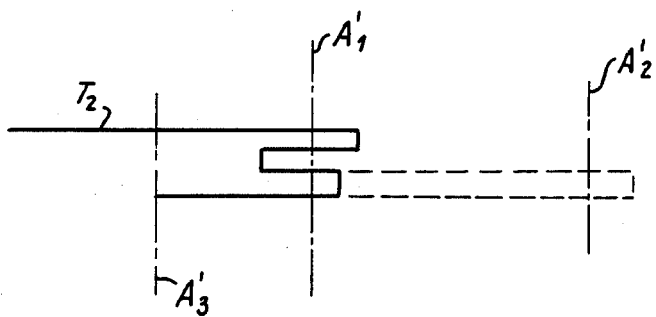

After cut-in address $A_1$ on tape $T_1$ has been selected and stored in memory 31 and cut-out address $A_2$ has been selected and stored in memory 51, editing control apparatus 15 is similarly operated for selecting a cut-in address $A'_1$ on the second or slave tape $T_2$ in VTR 12. More particularly and as shown on FIG. 3B, with the searching playback mode of VTR 12 established by suitable actuation of keys 16, relatively slow or searching forward movement of tape $T_2$ is effected while tape address counter 22 counts the control pulses or signals reproduced from tape $T_2$ by head 12a, and while the operator observes the images displayed on monitor 14 in response to the video signals being reproduced from tape $T_2$. When such observation indicates that tape $T_2$ has moved beyond the commencement of that portion of the video signals on tape $T_2$ which is to be replaced in the editing operation, tape $T_2$ is moved in the reverse direction for a short distance and then again moved in the forward direction at the slow searching speed. During the renewed slow forward movement of tape $T_2$, at the appearance on monitor 14 of the image exactly corresponding to the commencement of the portion of the video signals on tape $T_2$ to be replaced in the editing operation, the operator actuates a selected one of keys 16 for applying a gating pulse to terminal 34 so that gate circuit 30 is opened and the then existing content of counter 22, that is, the cut-in address $A'_1$, is stored in cut-in address memory 32. After the cut-in address $A'_1$ has been stored in memory 51, selected ones of keys 16 are actuated to apply a positive bias or signal to terminal 46 and to cause the reverse or rewind movement of tape $T_2$. In the course of such rewind movement of tape $T_2$, upon the coincidence of the content of tape address counter 22 with the stored content or cut-in address $A'_1$ in memory 32, the resulting output signal from comparator 36 is applied through AND circuit 45 to initiate the operation of reverse counter 41 with the result that the latter applies a signal to termunal 47 for halting the reverse movement of tape $T_2$ at the stand-by address $A'_3$ which is at the predetermined distance in the reverse direction from the cut-in address $A'_1$.

After the cut-in addresses $A_1$ and $A'_1$ have been selected and stored in memories 31 and 32, respectively, on the basis of the images observed on monitors 13 and 14 during the relatively slow speed or searching movement of tapes $T_1$ and $T_2$, small changes or corrections in the stored cut-in addresses may be effected by means of the switches 19 and 27 and correction pulse generator 60 and by means of the switches 20 and 28 and correction pulse generator 63, as previously described.

When the cut-in addresses $A_1$ and $A'_1$ and the cut-out address $A_2$ have been selected and stored in memories 31, 32, and 51, respectively, and the tapes $T_1$ and $T_2$ have been returned to their stand-by addresses $A_3$ and $A'_3$, system 10 is in condition for a tape editing operation. During such tape editing operation, a suitable signal is applied to terminal 54 in response to actuation of a selected one of keys 16 for causing selector 53 to connect a selected one of the tape address counters 21 and 22 to comparator 52. Usually, the tape address counter thus connected to comparator 52 is the one that was employed for selecting the cut-out address stored in memory 51. Thus, when the stored cut-out address $A_2$ is selected with reference to the video signals on the first or master tape $T_1$, as described above, the signal applied to terminal 54 causes selector 53 to connect the output of counter 21 with comparator 52.

Figure 3C:
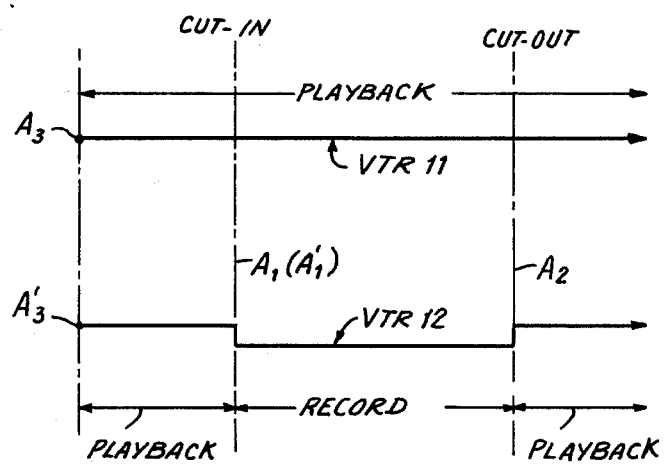

The tape editing operation is initiated by actuation of a selected one of keys 16 so as to cause simultaneous operation of VTRs 11 and 12 in their normal playback modes with both tapes $T_1$ and $T_2$ being simultaneously moved in the forward direction at the normal speed for reproducing of video signals therefrom starting from the stand-by addresses $A_3$ and $A'_3$ on tapes $T_1$ and $T_2$ (FIG. 3C). During the editing operation, a positive bias or signal is applied to each of the terminals 38 and 56 connected with AND circuits 37 and 55, respectively, and the forward movements of tapes $T_1$ and $T_2$ in VTRs 11 and 12 are controlled in the usual manner by the same external synchronizing signals for ensuring that both tape address counters 21 and 22 count up at the same rate in response to the control pulses being reproduced from tapes $T_1$ and $T_2$ by heads 11a and 12a.

As a result of the above, both tapes $T_1$ and $T_2$ simultaneously reach the respective cut-in addresses $A_1$ and $A'_1$, at which time the cut-in addresses stored in memories 31 and 32 coincide with the contents of tape address counters 21 and 22, respectively, so that comparators 35 and 35 simultaneously apply output signals to AND circuit 37 which, at the same time, is receiving the positive bias or signal applied to terminal 38. Therefore, when tapes $T_1$ and $T_2$ simultaneously reach their cut-in addresses $A_1$ and $A'_1$, AND circuit 37 provides an output signal to terminal 39 by which VTR 12 is changed-over from its playback mode to its record mode, as shown on FIG. 3C, with the result that the previously selected portion of the video signals being reproduced by VTR 11 from tape $T_1$ is recorded by VTR 12 on tape $T_2$. Such recording of signals on tape $T_2$ continues until the content of tape address counter 21 being applied through selector 53 to comparator 52 coincides with the cut-out address $A_2$ stored in memory 51. Upon coincidence of the content of counter 21 with the content stored in memory 51, comparator 52 provides an output signal to AND circuit 55 which is simultaneously receiving the positive bias or signal applied to terminal 56 so that AND circuit 55 provides an output or signal to terminal 57 by which VTR 12 is automatically changed-over from its record mode back to its playback mode for ending the editing of the second or slave tape $T_2$.

In the above description of operation of the editing control apparatus 15 according to this invention, the cut-out address stored in memory 51 has been the cut-out address $A_2$ or content of counter 21 applied through selector 48 and gate 50 to memory 51 at the end of a selected portion of the video signals being reproduced from tape $T_1$ with VTR 11 in its searching mode. However, if desired, selector 48 may be switched-over to apply the content of counter 22 through selector 48 to gate 50, in which case, the cut-out address stored in memory 51 is a content $A'_2$ of counter 22 occurring at the end of a selected portion of the video signals being reproduced from the tape $I_2$ with VTR 12 in its searching mode, as indicated in broken lines on FIG. 3B. In the latter case, that is, when the cut-out address $A'_2$ stored in memory 51 is determined with respect to the video signals originally recorded on tape $T_2$, then, during the editing operation, selector 53 is suitably controlled so that comparator 52 will receive the content of counter 22 for comparison with the stored content in memory 51 in determining the cut-out point at which VTR 12 is changed-over from its record mode back to its playback mode at the end of the editing operation.

In the embodiment of the editing control apparatus 15 described above with reference to FIG. 2, the start of the editing operation, that is, the change-over of VTR 12 from its playback mode to its record mode in response to the output from AND circuit 37 applied to terminal 39, results from the simultaneous application of the output signals from comparators 35 and 36 to AND circuit 37. However, if desired, an additional selector similar to the selectors 48 and 53 may be interposed between the outputs of comparators 35 and 36 and a single input to AND circuit 37 so that such additional selector will apply the output signal from either comparator 35 or comparator 36 to AND circuit 37 for changing-over VTR 12 from its playback mode to its record mode when the selected comparator provides an output signal upon coincidence of the content stored in memory 31 with the content of counter 21 or upon coincidence of the content stored in memory 32 with the content of counter 22, respectively. If, for example, only the output signal from comparator 35 is employed for effecting the change-over of VTR 12 from its playback mode to its record mode at the start of the editing operation, tape address counter 22, cut-in address memory 32 and comparator 36 are still required for ensuring the return of tape $T_2$ to its stand-by address $A'_3$ following the selection of the cut-in address $A'_1$ and the storing of such address in memory 32. In other words, the storing in memory 32 of the cut-in address $A'_1$ on tape $T_2$ is required so that, upon the rewinding or reverse movement of such tape, the output signal from comparator 36 upon coincidence of the content of counter 22 with the stored content in memory 32 will be available to initiate operation of reverse counter 41 for halting the reverse movement of tape $T_2$ at stand-by address $A'_3$.

It will be apparent that, in the tape editing system 10 having an editing control unit or apparatus 15 according to this invention as described above, the cut-out address $A_2$ as well as the cut-in addresses $A_1$ and $A'_1$ are selected and stored in the respective memories during the relatively slow searching movement of the tapes $T_1$ and $T_2$ so that the start and end of the editing operation can be accurately selected. Furthermore, the cut-in addresses $A_1$ and $A'_1$ can be even further corrected after their selection based on observation of monitors 13 and 14, through use of the correction pulses from generators 60 and 63, as previously described. Thus, at the completion of the editing operation, the edited tape $T_2$ has recorded thereon precisely the desired video signal information.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A tape editing system having a first VTR with means for effecting forward and reverse movement of a first tape therein and being operable, during forward movement of said first tape, in a playback mode for reproducing video signals recorded on said first tape, a second VTR with means for effecting forward and reverse movement of a second tape therein and being selectively operable, during forward movement of the second tape, in a playback mode for reproducing video signals recorded on said second tape and in a record mode for recording on said second tape the video signals being simultaneously reproduced from said first tape, and an editing control apparatus comprising first and second tape address counting means for up- and down-counting of addresses along said first and second tapes, respectively, during the forward and reverse movement, respectively, of the first and second tapes;

first and second cut-in address memory means operable for storing addresses indicated by said first and second tape address counting means, respectively, at the commencement of selected portions of the video signals on the first and second tapes, respectively;

first and second cut-in comparator means connected with said first and second tape address counting means and said first and second cut-in address memory means, respectively, for providing first and second cut-in output signals, respectively, upon coincidence of the addresses in said first and second tape address counting means with the stored addresses in said first and second cut-in address memory means, respectively;

first and second reverse counting means being operable by said first and second cut-in output signals, respectively, during reverse movement of said first and second tapes, respectively, said first and second reverse counting means including, respectively, first and second means for halting the reverse movement of said first and second tapes at stand-by addresses located at equal predetermined distances along said first and second tapes in the reverse direction from the cut-in addresses of said first and second tapes; and means for initiating the simultaneous forward playback modes of said first and second VTRs and causing the change-over of said second VTR to the recording mode upon the occurrence of said second cut-in output signal.

2. A tape editing system according to claim 1; in which said editing control apparatus further comprises gate means operable with said initiating and causing means for allowing the change-over of said second VTR from its playback mode to its recording mode, during simultaneous operation of said first and second VTRs in their playback modes, only upon the coincidence of said first and second output signals.

3. A tape editing system according to claim 1; in which said editing control apparatus further comprises cut-out address memory means for storing an address, from the respective tape address counting means, corresponding to an end of a selected portion of the video signals on either said first or second tape; cut-out comparator means connected with the respective tape address counting means and cut-out address memory means for providing a cut-out output signal upon coincidence of the address in the respective tape-address counting means with the stored address in said cut-out address memory means; and means responsive to said cut-out output signal for causing the change-over of said second VTR from its recording mode to its reproducing mode during simultaneous forward operation of said first and second VTRs in their respective reproducing mode and recording mode.

4. A tape editing system according to claim 1; in which said editing control apparatus further comprises cut-in correction means operable for replacing either or both of the addresses stored in said first and second cut-in address memory means with the addresses in said first and second tape address counting means, respectively, and means operable independently of the movement of said first and second tapes, for changing the address in said first and second tape address counting means.

5. A tape editing system according to claim 4; in which said means for changing the addresses in said first and second tape address counting means includes a source of correction pulses, and means for causing said first and second tape address counting to selectively count said correction pulses in the upward and downward directions.

* * * * *